United States Patent
Lee et al.

(10) Patent No.: US 10,261,744 B2
(45) Date of Patent: Apr. 16, 2019

(54) METHOD AND DEVICE FOR PROVIDING APPLICATION USING EXTERNAL ELECTRONIC DEVICE

(71) Applicant: Samsung Electronics Co., Ltd., Gyeonggi-do (KR)

(72) Inventors: Cheong-Jae Lee, Daegu (KR); Jun-Taek Lee, Daegu (KR); Min-Ho Kim, Gyeonggi-do (KR); Sung-Jun Kim, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/350,378

(22) Filed: Nov. 14, 2016

(65) Prior Publication Data
US 2017/0131962 A1 May 11, 2017

(30) Foreign Application Priority Data

Nov. 11, 2015 (KR) ........................ 10-2015-0158276

(51) Int. Cl.
*G06F 3/14* (2006.01)
*G06T 3/40* (2006.01)

(52) U.S. Cl.
CPC .......... *G06F 3/1454* (2013.01); *G06T 3/4092* (2013.01); *G09G 2370/042* (2013.01)

(58) Field of Classification Search
None
See application file for complete search history.

(56) References Cited

U.S. PATENT DOCUMENTS

| 7,982,598 B2 | 7/2011 | Bonansea et al. |
| 2010/0060572 A1 | 3/2010 | Tsern |

*Primary Examiner* — Gustavo D Polo
(74) *Attorney, Agent, or Firm* — Cha & Reiter, LLC.

(57) ABSTRACT

A control method of an electronic device provides an application using an external electronic device. The method may include acquiring, by an electronic device including a display, a request to run an application, the acquiring including identifying execution information on the application; comparing the execution information with first device information corresponding to the electronic device and second device information corresponding to the external electronic device comprising another display. An execution screen of the application is provided through the display when the execution information corresponds to the first device information. The execution screen of the application or meta information corresponding to the execution screen to the external electronic device for output, so that the execution screen is provided through the other display when the execution information corresponds to the second device information.

23 Claims, 14 Drawing Sheets

(a)

(b)

METHOD AND DEVICE FOR PROVIDING APPLICATION USING EXTERNAL ELECTRONIC DEVICE

CLAIM OF PRIORITY

This application claims the benefit of priority under 35 U.S.C. § 119(a) from Korean Application Serial No. 10-2015-0158276, which was filed in the Korean Intellectual Property Office on Nov. 11, 2015, the entire content of which is hereby incorporated by reference in its entirety.

BACKGROUND

1. Field of the Disclosure

Various embodiments of the present disclosure relate to the operation of an electronic device. More particularly, the present disclosure relates to a method and a device for providing an application using an external electronic device.

2. Description of the Related Art

An electronic device (for example, a smartphone) may be connected via wireless communication with an external electronic device (for example, a TV or smartwatch). The electronic device may transmit information (for example, content or application) to the connected external electronic device.

For example, the electronic device may transmit information displayed on a screen (for example, content or application) of the electronic device to the external electronic device so that a same screen may be displayed by the external electronic device that is functionally connected with the electronic device. Further, the electronic device may transmit information to the external electronic device regarding a sound output so that the same sound is output from the electronic device and the external electronic device that is functionally connected with the electronic device.

A technique referred to as "screen mirroring" involves a display of the same screen on a plurality of electronic devices may be defined as screen mirroring. Screen mirroring may refer to a technique that enables a screen displayed on one terminal to be displayed in a same manner on another terminal.

However, the conventional screen mirroring may display the same information as displayed on the electronic device through an external electronic device having a larger screen than the electronic device. For example, when the electronic device receives a video call while the first application is running (i.e. operating) and an execution screen of the application is being displayed on the electronic device, the external electronic device connected with the electronic device is allowed to display only a video call screen resulting from the received video call instead of the execution screen of the existing application.

SUMMARY

The present disclosure provides a patentable improvement over conventional screen mirroring in order to enable an electronic device to display, on an external electronic device, the same (or similar) screen as displayed on the electronic device or a screen reconstructed in size and ratio from the screen, and a second screen. For example, the present disclosure may provide an electronic device and a method that display an execution screen of a second application (for example, a video call) only through one (for example, electronic device) of an electronic device and an external electronic device and displaying an execution screen of an existing first application through another electronic device (for example, external electronic device) when the electronic device receives a request to run the second application while the first application is running, and thus the execution screen of the first application is being displayed through the electronic device and the external electronic device.

A method of providing an application using an external electronic device according to various embodiments of the present disclosure may include: acquiring, by an electronic device including a display, a request to run an application, the acquiring including identifying execution information on the application; comparing the execution information with first device information corresponding to the electronic device and second device information corresponding to the external electronic device including another display; providing an execution screen of the application through the display when the execution information corresponds to the first device information; and transmitting a command and data to display the execution screen of the application or display information (e.g. meta information) corresponding to the execution screen to the external electronic device so that the execution screen is provided through the other display when the execution information corresponds to the second device information.

An electronic device for providing an application using an external electronic device according to various embodiments of the present disclosure may include a non-transitory memory that stores first device information on the electronic device; a display; a communication module including hardware such as a receiver, transmitter, or transceiver, that communicates with the external electronic device; and a processor having circuitry in which the processor may be configured to: acquire a request to run an application, in which the processor identifies execution information on the application; compare the execution information with first device information and second device information corresponding to the external electronic device including another display; provide an execution screen of the application through the display when the execution information corresponds to the first device information; and transmit a command and data to display the execution screen of the application or display information (e.g. meta information) to the external electronic device through the communication module so that the execution screen is provided through the other display when the execution information corresponds to the second device information.

A computer-readable storage device recording a program that provides an application using an external electronic device according to various embodiments of the present disclosure may record the program to perform: acquiring, by an electronic device including a display, a request to run an application, the acquiring including identifying execution information on the application; comparing the execution information with first device information corresponding to the electronic device and second device information corresponding to the external electronic device including another display; providing an execution screen of the application through the display when the execution information corresponds to the first device information; and transmitting the execution screen or display information corresponding to the execution screen to the external electronic device so that the execution screen is provided through the other display when the execution information corresponds to the second device information.

According to various embodiments of the present disclosure, devices to respectively run a plurality of applications may be determined to operate from among an electronic device and an external electronic device based on information on at least one of the plurality of applications to run on the electronic device, thereby maximizing user experience of the electronic devices.

Further, according to various embodiments of the present disclosure, when a user receives a phone call while watching one screen (for example, a content or an execution screen of an application) on the electronic device, the user may answer the phone call through an external electronic device (or electronic device) while continuing to watch the screen through the electronic device (or external electronic device).

BRIEF DESCRIPTION OF THE DRAWINGS

The above and other aspects, features, and advantages of the present disclosure will become more apparent to a person of ordinary skill in the art from the following detailed description taken in conjunction with the accompanying drawings, in which.

DETAILED DESCRIPTION

Figure 1:
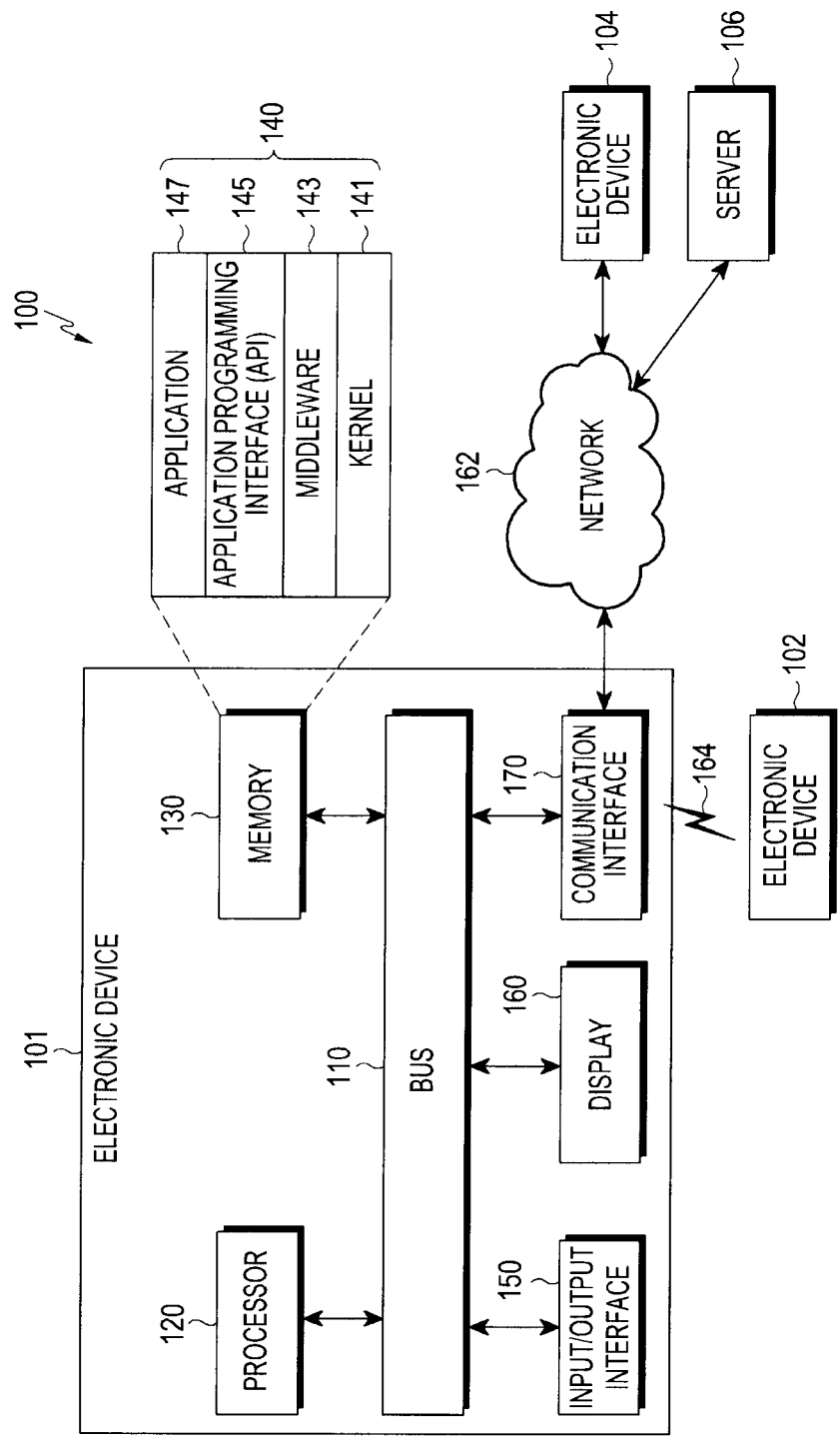
FIG. 1 is a block diagram illustrating an electronic device and a network according to various embodiments of the present disclosure.

Hereinafter, various embodiments of the present disclosure will be described with reference to the accompanying drawings. However, it should be understood by a person of ordinary skill in the art that the present disclosure is not limited to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refer to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "designed to", "adapted to", "made to", or according to the situation. The term "configured to" may not necessarily imply "specifically designed to" in hardware. For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and do not limit the scope of other embodiments. A singular expression may include a plural expression unless they are expressed in a different context that may not permit for a plural expression. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments of the present disclosure, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. For example, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

An electronic device 101 in a network environment 100 according to various embodiments is described with reference to FIG. 1. The electronic device 101 may include a bus 110, a processor 120, a non-transitory memory 130, an input/output interface 150, a display 160, and a communication module 170. In some embodiments, at least one of the components may be omitted or an additional component may be further included in the electronic device 101.

The bus 110 may include, for example, a circuit that connects the components 110 to 170 to each other and delivers communications (for example, control messages) between the components.

The processor 120, which includes hardware circuitry such as integrated circuits, may include one or more of a central processing unit (CPU), an application processor (AP), and a communication processor (CP). The processor 120 may control, for example, at least one different component of the electronic device 101 and/or may perform an operation relating to communication or data processing.

The memory 130 may include a volatile and/or nonvolatile memory. The memory 130 may store, for example, a command or data related to at least one different component of the electronic device 101. According to one embodiment, the memory 130 may store software and/or a program 140. The program 140 may include, for example, a kernel 141, middleware 143, an application programming interface (API) 145, and/or an application program (or "application") 147. At least part of the kernel 141, the middleware 143, and the API 145 may be designated as an operating system (OS).

The kernel 141 may control or manage system resources (for example, the bus 110, the processor 120, the memory 130, or the like) used to perform an operation or function implemented in other programs (for example, the middleware 143, the API 145, or the application program 147). Further, the kernel 141 may provide an interface that allows the middleware 143, the API 145, or the application program 147 to access an individual component of the electronic device 101 to thereby control or manage the system resources.

The middleware 143 may serve as a relay so that, for example, the API 145 or the application program 147 communicates with the kernel 141 to exchange data.

Further, the middleware 143 may process one or more requests for operations received from the application program 147 according to priority. For example, the middleware 143 may assign at least one application program 147 a priority for using a system resource (for example, the bus 110, the processor 120, the memory 130, or the like) of the electronic device 101. The middleware 143 may process the one or more requests for operations according to the priority assigned to the at least one application program, thereby performing scheduling or load balancing for the one or more requests for operations.

The API 145 is, for example, an interface for the application 147 to control a function provided from the kernel 141 or the middleware 143 and may include, for example, at least one interface or function (for example, a command) for file control, window control, image processing, or text control.

The input/output interface 150 may serve as an interface that delivers a command or data, which is input from, for example, a user or different external device, to a different component(s) of the electronic device 101. Further, the input/output interface 150 may output a command or data, which is received from a different component(s) of the electronic device 101, to the user or different external device.

With continued reference to FIG. 1, the display 160 may include, for example, a liquid crystal display (LCD), a light emitting diode (LED) display, an organic light emitting diode (OLED) display, a microelectromechanical systems (MEMS) display, and an electronic paper display. The display 160 may display, for example, various types of content (for example, a text, an image, a video, an icon, a symbol, or the like) for the user. The display 160 may include a touch screen and may receive a touch, a gesture, a proximity ("near-touch"), or hovering inputs using, for example, an electronic pen or a user body part.

The communication module 170, which may include a transmitter, receiver, transceiver, and have an antenna or antenna array coupled thereto, may establish communication, for example, between the electronic device 101 and an external device (for example, a first external electronic device 102, a second external electronic device 104, or a server 106). For example, the communication module 170 may be connected to a network 162 via wireless communication or wire-based communication to communicate with the external device (for example, the second external electronic device 104 or the server 106).

The wireless communication may use, for example, any of a cellular communication protocol, for example, at least one of Long-Term Evolution (LTE), LTE-Advanced (LTE-A), code division multiple access (CDMA), wideband CDMA (WCDMA), universal mobile telecommunications system (UMTS), Wireless Broadband (WiBro), and Global System for Mobile Communications (GSM). Further, the wireless communication may include, for example, short-range communication 164. The short-range communication 164 may include, for example, at least one of Wireless Fidelity (Wi-Fi), Bluetooth, Near Field Communication (NFC), and global navigation satellite system (GNSS). The GNSS may include, for example, at least one of a global positioning system (GPS), a global navigation satellite system (Glonass), a Beidou navigation satellite system (hereinafter, "Beidou"), and Galileo, which is the European global satellite-based navigation system, depending on a use area or bandwidth. In the present disclosure, "GPS" may be interchangeably used with "GNSS" hereinafter. The wire-based communication may include, for example, at least one of universal serial bus (USB), high definition multimedia interface (HDMI), recommended standard 232 (RS-232), and plain old telephone service (POTS). The network 162 may include a telecommunications network, for example, at least one of a computer network (for example, a local area network (LAN) or wide area network (WAN)), the Internet, and a telephone network.

The first and second external electronic devices 102 and 104 may each be a device of a type that is the same as, or different from, the electronic device 101. According to one embodiment, the server 106 may include a group of one or more servers. According to various embodiments, all or part of operations performed in the electronic device 101 may be performed in another electronic device or a plurality of electronic devices (for example, the electronic devices 102 and 104 or the server 106). According to one embodiment of the disclosure, when the electronic device 101 needs to perform a function or service automatically or by request, the electronic device 101 may request another electronic device (for example, the electronic device 102 or 104, or the server 106) to perform at least some of the functions related to the function or service, instead of, or in addition to, autonomously performing the function or service. The other electronic device (for example, the electronic device 102 or 104, or the server 106) may perform the requested functions or additional function and may transmit the result to the electronic device 101. The electronic device 101 may provide the requested function or service by using the same received result or additionally processing the result. To this end, cloud computing, distributed computing, or client-server computing technologies may be used.

Figure 2:
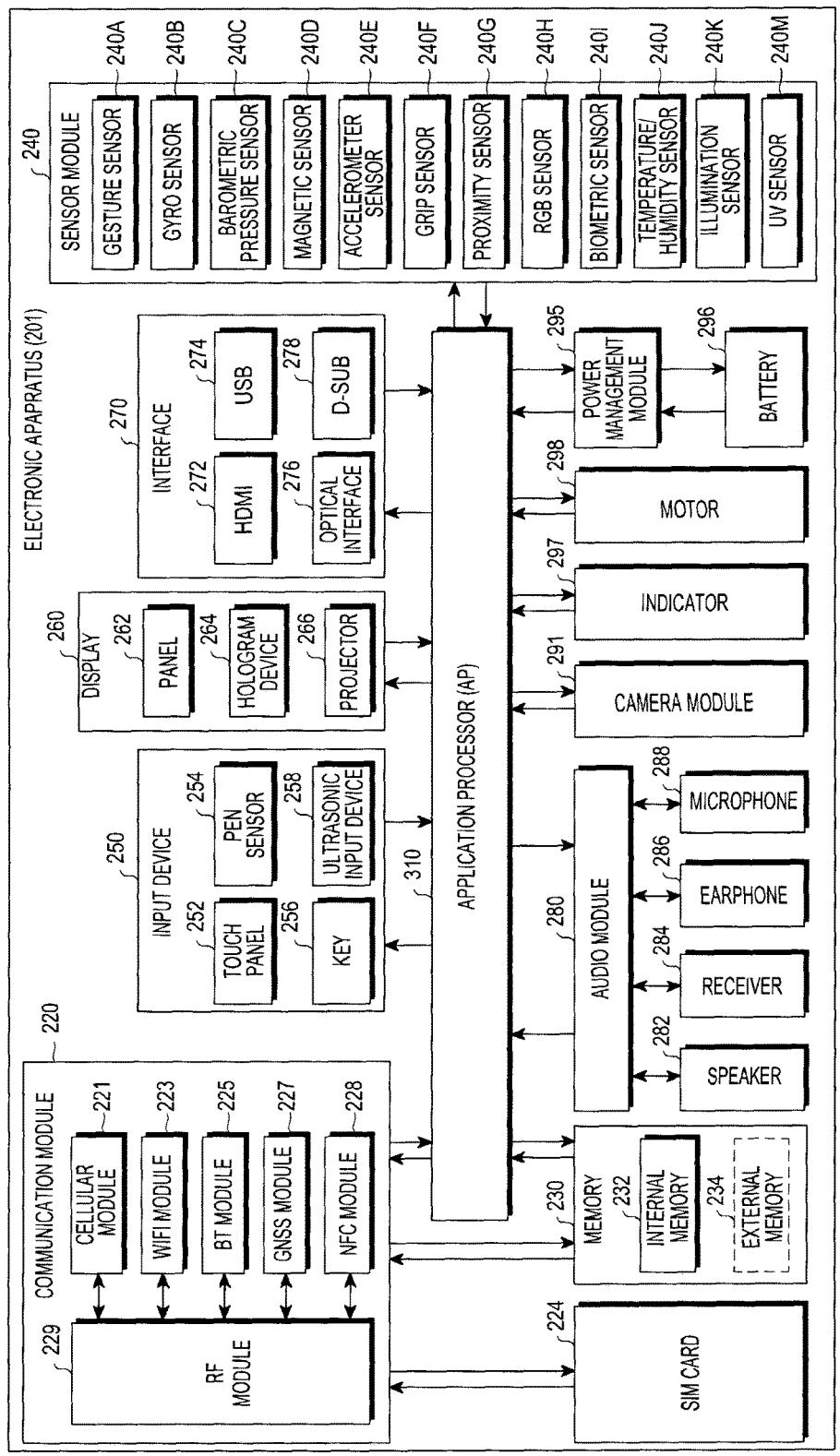
FIG. 2 is a block diagram of an electronic device according to various embodiments of the present disclosure.

FIG. 2 is a block diagram of an electronic device 201 according to various embodiments. The electronic device 201 may include, for example, the whole or part of the electronic device 101 illustrated in FIG. 1. The electronic device 201 may include one or more processors (for example, APs) 210, a communication module 220, a subscriber identification module (SIM) 224, a non-transitory memory 230, a sensor module 240, an input device 250, a display 260, an interface 270, an audio module 280, a camera module 291, a power management module 295, a battery 296, an indicator 297, and a motor 298.

The processors 210, which include hardware circuitry configured for operation may run (i.e. execute, operate), for example, an OS or an application program to control a plurality of hardware or software components that are connected to the processors 210 and may perform various kinds of data processing and operations. The processors 210 may be configured, for example, as a system on chip (SoC). According to one embodiment of the present disclosure, the processors 210 may further include a graphic processing unit (GPU) and/or an image signal processor. The processors 210 may include at least part (for example, a cellular module 221) of the components illustrated in FIG. 2. The processors 210 may load a command or data received from at least one of other components (for example, a nonvolatile memory) into a volatile memory to process the command or data and may store various kinds of data in the nonvolatile memory.

The communication module 220 may have a configuration that is the same as, or similar to, that of the communication interface 170 in FIG. 1. The communication module 220 may include, for example, a cellular module 221, a Wi-Fi module 223, a Bluetooth module 225, a global navigation satellite system (GNSS) module 227 (for example, a global positioning system (GPS) module, a Glonass module, a Beidou module, or a Galileo module), a near field communication (NFC) module 228, and a radio frequency (RF) module 229.

The cellular module 221 may provide, for example, a voice call, a video call, a text messaging service, or an Internet service through a communication network. According to one embodiment, the cellular module 221 may perform identification and authentication of the electronic device 201 in a communication network using the SIM (for example, an SIM card) 224. According to one embodiment of the present disclosure, the cellular module 221 may perform at least part of the functions provided by the processors 210. According to one embodiment of the present disclosure, the cellular module 221 may include a communication processor (CP).

The Wi-Fi module 223, the Bluetooth module 225, the GNSS module 227, and the NFC module 228 may each include a processor to process data transmitted and received via the respective modules. According to one embodiment of the present disclosure, at least part (for example, two or more) of the cellular module 221, the Wi-Fi module 223, the Bluetooth module 225, the GNSS module 227, and the NFC module 228 may be included in one integrated chip (IC) or IC package.

The RF module 229. which includes hardware such as a transmitter, receiver and/or transceiver, may transmit and receive, for example, a communication signal (for example, an RF signal). The RF module 229 may include, for example, a transceiver, a power amplifier (amp) module (PAM), a frequency filter, a low noise amplifier (LNA), an antenna, or the like. According to another embodiment, at least one of the cellular module 221, the Wi-Fi module 223, the Bluetooth module 225, the GNSS module 227, and the NFC module 228 may transmit and receive an RF signal through a separate RF module.

The SIM 224 may include, for example, a card including an SIM and/or an embedded SIM and may include unique identification information (for example to prevent unauthorized usage, an integrated circuit card identifier (ICCID)) or subscriber information (for example, an international mobile subscriber identity (IMSI)).

The memory 230 (for example, a memory 130) may include, for example, an internal memory 232 and/or an external memory 234. The internal memory 232 may include, for example, at least one of a volatile memory (for example, a dynamic random-access memory (DRAM), a static RAM (SRAM), a synchronous dynamic RAM (SDRAM), or the like) and a nonvolatile memory (for example, a one-time programmable read-only memory (OTPROM), a programmable ROM (PROM), an erasable and programmable ROM (EPROM), an electrically erasable and a programmable ROM (EEPROM), a mask ROM, a flash ROM, a flash memory (for example, an NAND flash, an NOR flash, or the like), a hard drive, or a solid state drive (SSD)).

The external memory 234 may further include a flash drive, for example, a compact flash (CF), a secure digital (SD), a micro secure digital (micro-SD), a mini secure digital (mini-SD), an extreme digital (xD), a multi-media card (MMC), a memory stick, or the like. The external memory 234 may be functionally and/or physically connected to the electronic device 201 through various interfaces.

With continued reference to FIG. 2, the sensor module 240 may measure, for example, physical quantities or may detect an operation state of the electronic device 201 and convert measured or detected information into an electrical signal. The sensor module 240 may include, for example, at least one of a gesture sensor 240A, a gyro sensor 240B, a barometric pressure sensor 240C, a magnetic sensor 240D, an accelerometer 240E, a grip sensor 240F, a proximity sensor 240G a color sensor 240H (for example, a red, green, and blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. In one embodiment, the electronic device 201 may further include a processor configured, as a part of the processors 210 or separately from the processors 210, to control the sensor module 240, thereby controlling the sensor module 240 while the processors 210 are in a sleep state.

The input device 250 may include, for example, a touch panel 252, a (digital) pen sensor 254, a key 256, or an ultrasonic input device 258. The touch panel 252 may use, for example, at least one of an electrostatic type, a pressure-sensitive type, an infrared type, and an ultrasonic type. Further, the touch panel 252 may further include a control circuit. The touch panel 252 may further include a tactile layer to provide a user with a tactile response.

The (digital) pen sensor 254 may, for example, be part of the touch panel or include a separate recognition sheet. The key 256 may include, for example, a physical button, an optical key, or a keypad. The ultrasonic input device 258 may detect ultrasonic waves generated in an input tool through a microphone (for example, a microphone 288) and may identify data corresponding to the detected ultrasonic waves.

The display 260 (for example, a display 160) may include a panel 262, a hologram device 264, or a projector 266. The panel 262 may include a configuration that is the same as, or similar to, that of the display 160 of FIG. 1. The panel 262 may be configured, for example, to be flexible, transparent, or wearable. The panel 262 may be formed with the touch panel 252 in a single module. The hologram device 264 may display a three-dimensional image in the air using the interference of light. The projector 266 may project light onto a screen to display an image. The screen may be disposed, for example, inside or outside the electronic device 201. According to one embodiment of the present disclosure, the display 260 may further include a control circuit to control the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 170 illustrated in FIG. 1. Additionally or alternatively, the interface 270 may include, for example, a mobile high-definition link (MHL) interface, an SD card/MMC interface, or an Infrared Data Association (IrDA) interface.

The audio module 280 may convert, for example, between a sound and an electrical signal reciprocally. At least some components of the audio module 280 may be included, for example, in an input/output interface 150 illustrated in FIG. 1. The audio module 280 may process sound information for input or output, for example, through a speaker 282, a receiver 284, earphones 286, or the microphone 288.

The camera module 291 is a device that takes, for example, a still image and a video. According to one embodiment of the present disclosure, the camera module 291 may include one or more image sensors (for example, a front sensor or a rear sensor), a lens, an image signal processor (ISP), or a flash (for example, an LED, a xenon lamp, or the like).

The power management module 295 may manage, for example, the power of the electronic device 201. According to one embodiment of the present disclosure, the power management module 295 may include a power management integrated circuit (PMIC), a charger integrated circuit (IC), or a battery or fuel gauge. The PMIC may have wire-based and/or wireless charging methods. The wireless charging methods may include, for example, a magnetic resonance method, a magnetic induction method, or an electromagnetic wave method, and may further include an additional circuit for wireless charging, such as a coil loop, a resonance circuit, or a rectifier. The battery gauge may measure, for example, the remaining battery charge, the charging voltage, the current, or temperature of the battery 296. The battery 296 may include, for example, a rechargeable battery and/or a solar battery.

The indicator 297 may in its simplest form display a specific state of the electronic device 201 or a component thereof (for example, the processors 210), for example, a booting state, a message state, or a charging state. However, the manner in which the indication is made is not limited to the description herein. The motor 298 may convert an electrical signal into mechanical vibrations and may generate vibrations or a haptic effect. Although not shown, the electronic device 201 may include a processing device for supporting a mobile TV (for example, a GPU). The processing device for supporting the mobile TV may process media data in accordance with digital multimedia broadcasting (DMB), digital video broadcasting (DVB), or mediaFlo™ standards.

Each of the above-described components of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments of the present disclosure may be combined into one entity, which may perform functions identical to those of the relevant components before the combination.

Figure 3:
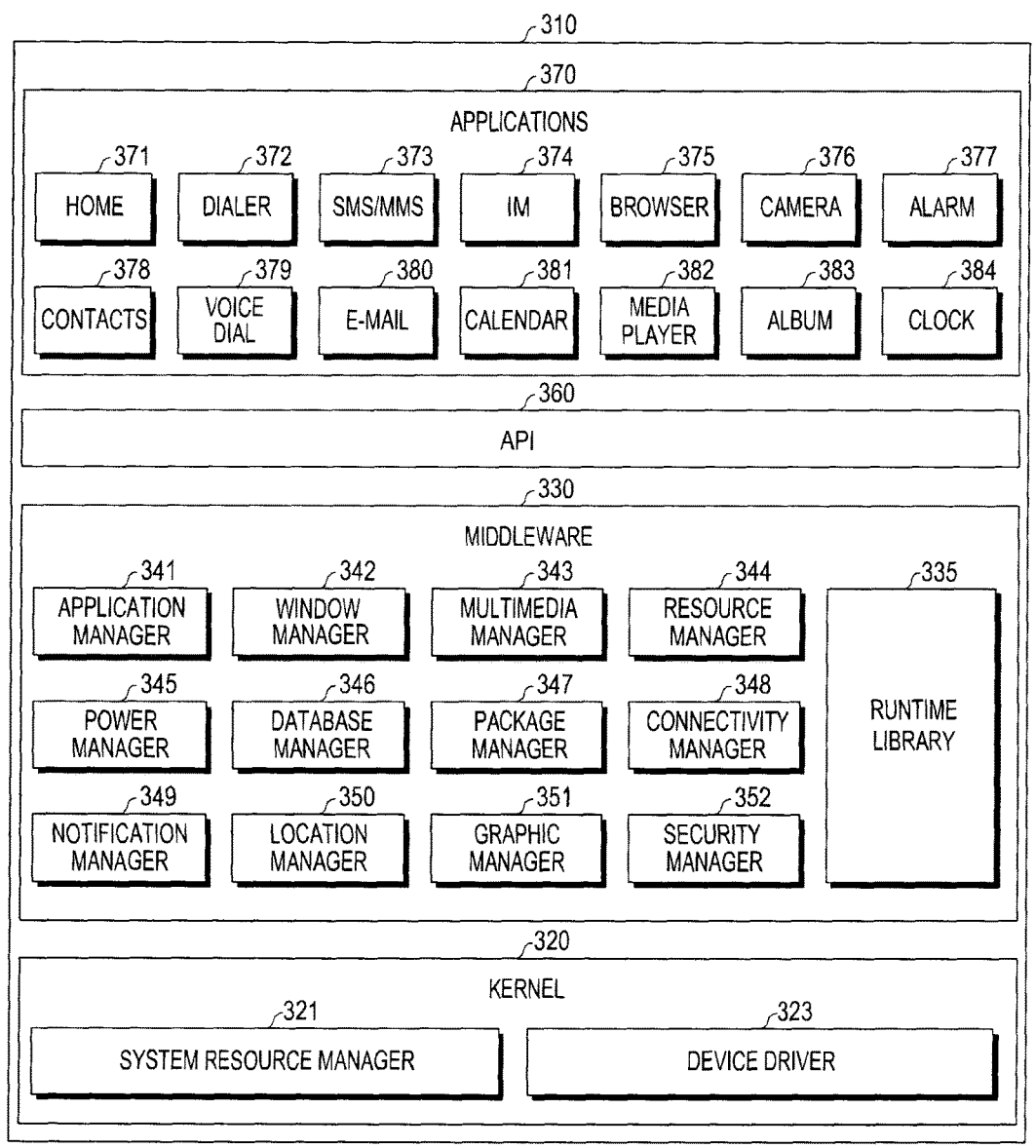
FIG. 3 is a block diagram of a program module according to various embodiments of the present disclosure.

FIG. 3 is a block diagram of a program module according to various embodiments. According to one embodiment of the present disclosure, the program module 310 (for example, the program 140) may include an OS that controls resources related to an electronic device (for example, the electronic device 101) and/or various applications (for example, the application program 147) that operate on the OS. The OS may be, for example, Android, iOS, Windows, Symbian, Tizen, Bada, or the like.

The program module 310 may include, for example, a kernel 320, middleware 330, an API 360, and/or an application 370. At least part of the program module 310 may be preloaded onto the electronic device or be downloaded from an external electronic device (for example, the electronic device 102 or 104, the server 106, or the like).

The kernel 320 (for example, the kernel 141) may include, for example, a system resource manager 321 and/or a device driver 323. The system resource manager 321 may perform control, allocation, or recovery of system resources; according to one embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter-process communication ((IPC) driver.

With continued reference to FIG. 3, the middleware 330 may provide, for example, a function commonly needed for applications 370 or may provide the application 370 with various functions through the API 360 so that the application 370 may efficiently use limited systems resources in the electronic device. According to one embodiment of the present disclosure, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and an execution manager 353.

The runtime library 335 may include, for example, a library module used by a complier to add a new function through a programming language while the application 370 is running. The runtime library 335 may perform functions for input/output management, memory management, or arithmetic function.

The application manager 341 may manage, for example, the life cycle of at least one application from among the applications 370. The window manager 342 may manage graphic user interface (GUI) resources used for a screen. The multimedia manager 343 may identify formats necessary to play various media files and may encode or decode a media file using a codec suitable for a corresponding format. The resource manager 344 may manage resources, such as a source code, a memory, or a storage space, for at least one application among the applications 370.

The power manager 345 may operate with, for example, a basic input/output system (BIOS) to manage a battery or power supply and may provide information on power necessary for an operation of the electronic device. The database manager 346 may generate, retrieve, or change a database to be used for at least one application among the applications 370. The package manager 347 may install or update an application distributed in the form of a package file.

The connectivity manager 348 may manage the wireless connectivity, for example, via Wi-Fi or Bluetooth. The notification manager 349 may display or report an incoming message, an appointment, and an event including a proximity notification in a manner that does not disturb a user. The location manager 350 may manage location information on the electronic device. The graphic manager 351 may manage a graphic effect to be provided for the user or a user interface related to the graphic effect. The security manager 352 may provide overall security functions necessary for system security or user authentication.

The execution manager 353 may determine a device for which an application execution screen is provided among the electronic device and external electronic devices. According to one embodiment of the present disclosure, at least some functions of the execution manager 353 may be included in the API 360 or the application 370. According to one embodiment, when the electronic device (for example, the electronic device 101) has phone features, the middleware 330 may further include a telephony manager to manage a voice or video call function of the electronic device.

The middleware 330 may include a middleware module that forms combinations of various functions of the foregoing components. The middleware 330 may provide a specialized module for each type of an OS in order to provide a differentiated function. Further, the middleware 330 may dynamically delete some of the existing components or add new components.

The API 360 (for example, the API 145) is, for example, a set of API programming functions and may be provided with a different configuration depending on an OS. For example, one API set for each platform may be provided in Android or iOS, while two or more API sets for each platform may be provided in Tizen.

The application 370 (for example, the application program 147) may include one or more applications that can perform functions of, for example, a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, a clock 384, or a health care (for example, for measuring exercising or blood sugar), an environmental data application (for example, for providing atmospheric pressure, humidity, or temperature data), or the like.

According to one embodiment of the present disclosure, the application 370 may include an application (hereinafter, "information exchange application" for convenience of description) that supports information exchanges between the electronic device (for example, the electronic device 101) and an external electronic device (for example, the electronic device 102 or 104). The information exchange application may include, for example, a notification relay application for relaying specific information to the external electronic device or a device management application for managing the external electronic device.

For example, the notification relay application may include a function of relaying notification information, which is generated in another application (for example, the SMS/MMS application, the email application, the health care application, the environmental data application, or the like) of the electronic device, to the external electronic device (for example, the electronic device 102 or 104). Additionally, the notification relay application may receive notification information, for example, from the external electronic device and provides the notification information to the user.

The device management application may manage (for example, install, delete, or update), at least one function (for example, a function of turning on/turning off the external electronic device itself (or some components) or adjusting the brightness (or resolution) of a display) of the external electronic device (for example, the electronic device 102 or 104) communicating with the electronic device, an application operating in the external electronic device, or a service (for example, a call service or message service) provided by the external electronic device.

According to one embodiment of the present disclosure, the application 370 may include an application (for example, a health care application of a mobile medical device) assigned according to an attribute of the external electronic device (for example, the electronic device 102 or 104). According to one embodiment of the present disclosure, the application 370 may include an application received from the external electronic device (for example, the server 106 or the electronic device 102 or 104). According to one embodiment, the application 370 may include a third party application that may be downloaded from a preloaded application or the server. The illustrated components of the program module 310, according to the various embodiments of the present disclosure, may be named different terms depending on an OS type.

According to various embodiments of the present disclosure, at least part of the program module 310 may be implemented in software, firmware, hardware, or combinations of at least two or more. At least part of the program module 310 may be implemented (for example, run) by, for example, a processor (for example, the processor 210 having circuitry). At least part of the program module 310 may include, for example, a module, a program, a routine, sets of instructions, or a process to perform one or more functions.

Hereinafter, an electronic device and a control method of the electronic device, and more particularly a method for providing an application execution screen through the electronic device according to various embodiments, are described in detail with reference to FIGS. 4 to 12.

Figure 4:
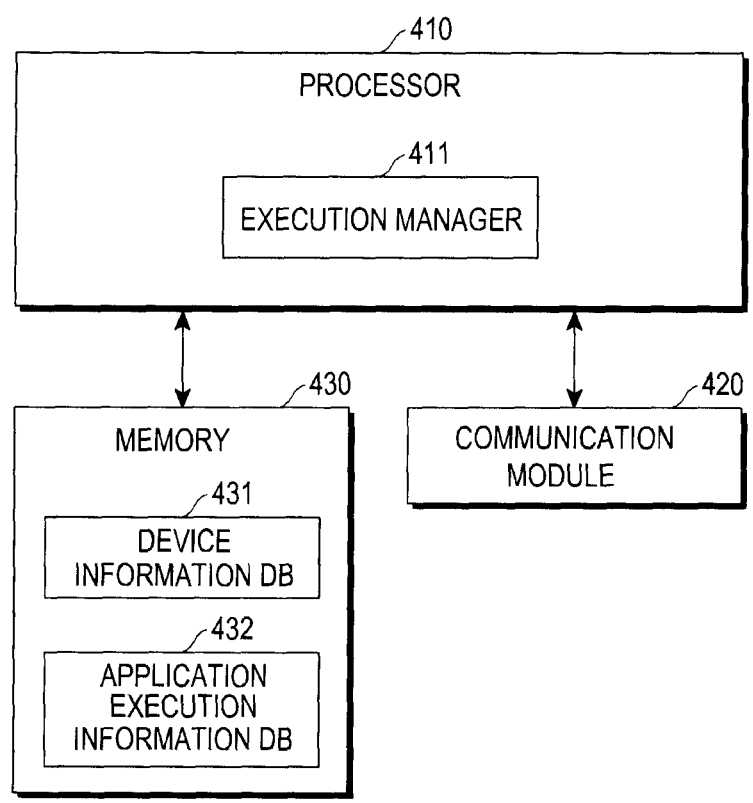
FIG. 4 is a block diagram of an electronic device according to various embodiments of the present disclosure of the present disclosure.

FIG. 4 is a block diagram of an electronic device according to various embodiments of the present disclosure.

As illustrated in FIG. 4, the electronic device (for example, the electronic device 101) according to the various embodiments may include a processor 410, a communication module 420, and a non-transitory memory 430.

According to various embodiments, the communication module 420 includes one or more of a transmitter, receiver, transceiver, and may functionally connect (for example, via wireless or wire-based communication) the electronic device (for example, the electronic device 101 in FIG. 1) with an external electronic device (for example, the electronic device 104). For example, when a request for a connection is acquired from the processor 410, the communication module 420 may receive information for identifying the external electronic device 104 from the external electronic device 104 according to the request from the processor 410. The communication module 420 may receive information on the external electronic device 104 from the external electronic device 104. According to various embodiments of the present disclosure, the communication module 420 may transmit, to the external electronic device 104 according to the request from the processor 410, first application execution data necessary for providing a first application execution screen or second application execution data necessary for providing a second application execution screen.

According to various embodiments of the present disclosure, the memory 430 may include a device information database (DB) 431 or an application execution information DB 432. For example, the device information DB 431 may store device information on the electronic device 101 or device information on the external electronic device 104. For example, device information may include any one or more from among resolution information and output information on each device (for example, a display included in the electronic device 101 or a display included in the external electronic device 104), and OS information on each device (for example, the electronic device 101 or the external electronic device 104). For example, application execution information may include any from one or more conditions among resolution information and output information on each application execution screen, and an OS condition for providing each application execution screen.

According to various embodiments of the present disclosure, the processor 410 may run an application. According to various embodiments, the processor 410 may display an execution screen of the run application through a display (for example, the display 160).

According to various embodiments, the processor 410 may include an execution manager 411 (for example, the execution manager 353). According to various embodiments, the execution manager 411 may, for example, acquire execution information on the application run by the processor 410 from the application execution information DB 432 of the memory 430. According to various embodiments of the present disclosure, the execution manager 411 may acquire execution information on the application, for which an execution request is acquired, from the application execution information DB 432 of the memory 430. According to various embodiments, the execution manager 411 may acquire device information on an electronic device (for example, the electronic device 101 in FIG. 1) from the device information DB 431. According to various embodiments of the present disclosure, the execution manager 411 may acquire device information on an external electronic device (for example, the electronic device 104 in FIG. 1), which is provided outside the electronic device 101, from the device information DB 431 or from the external electronic device 104 through a communication module (for example, the communication module 420 in FIG. 4 or the wireless/wire-based communication 162 in FIG. 1).

For example, the execution manager 411 may acquire the device information on the external electronic device 104 from the external electronic device 104 based on the electronic device 101 that is functionally connected with the external electronic device (via wire-based or wireless communication). Further, the execution manager 411 may acquire the device information on the external electronic device 104 from the external electronic device 104 in response to a request to provide an application execution screen, which is acquired by the electronic device 101.

According to various embodiments, the execution manager 411 may acquire the device information on the external electronic device 104 from another external electronic device (for example, a server).

According to various embodiments of the present disclosure, the execution manager 411 may compare each acquired device information and each acquired application execution information, and may determine a device to provide each application execution screen through based on the acquired device information and application execution information. For example, the execution manager 411 may determine a device that satisfies an application execution condition included in application execution information and may provide each application execution screen through the determined device. For example, the execution manager 411 may compare execution information on an application (for example, one or more pieces of information among resolution information, output information on an execution screen, and OS information for running an application) with device information on each device (for example, one or more pieces of information among resolution information, output information, and OS information), and may determine a device to provide an execution screen of the application according to a comparison result.

For example, when execution information on an application corresponds to (for example, is the same as or similar to) the device information on the electronic device, an execution screen of the application may be provided (for example, displayed) through the electronic device (for example, the display included in the electronic device). Further, when execution information on an application corresponds to (for example, is the same as or similar to) the device information on the external electronic device, an execution screen of the application or display information (for example, meta information) corresponding to the execution screen (or for playing the execution screen) may be transmitted to the external electronic device. Accordingly, the execution screen of the application may be provided through the external electronic device (for example, the display included in the external electronic device).

For example, the electronic device that can provide a first resolution may be connected with the external electronic device that can provide a second resolution different than the first resolution. When the electronic device is requested to provide an execution screen of an application (for example, a content play application) that may be provided using a third resolution, the execution manager 411 may compare the third resolution with the first resolution and the second resolution. When the third resolution (for example, about 326 pixels per inch (ppi)) is higher than, or equal to, the first resolution (for example, about 162.97 ppi) and is lower than the second resolution (for example, about 401 ppi), the execution manager 411 may determine the external electronic device is able to provide the second resolution as a device for providing the execution screen of the application. When the third resolution (for example, about 326 ppi) is lower than the first resolution (for example, about 401 ppi) and is higher than, or equal to, the second resolution (for example, about 162.97 ppi), the execution manager 411 may determine the electronic device is able to provide the first resolution as a device for providing the execution screen of the application. For example, the electronic device that can provide a first output mode may be connected with the external electronic device that can provide a second output mode. When the electronic device is requested to provide an execution screen of an application (for example, a music play application) that may be provided using a third output mode, the execution manager 411 may compare the third output mode with the first output mode and the second output mode. When the third output mode (for example, stereo speaker 4) is higher than, or equal to, the first output mode (for example, stereo speaker 2) and is lower than the second output mode (for example, speaker 5), the execution manager 411 may determine the external electronic device is able to provide the second output mode as a device for providing the execution screen of the application. When the third output mode (for example, stereo speaker 2) is lower than the first output mode (for example, stereo speaker 4) and is higher than, or equal to, the second output mode (for example, mono speaker 1), the execution manager 411 may determine the electronic device is able to provide the first output mode as a device for providing the execution screen of the application.

For example, the electronic device that can provide a first OS may be connected with the external electronic device that can provide a second OS. When the electronic device is requested to provide an execution screen of an application (for example, a game application) that may be provided using a third OS, the execution manager 411 may compare the third OS with the first OS and the second OS. When the third OS (for example, Windows 7) is more recent than, or the same as, the first OS (for example, Linux) and is older than the second OS (for example, Windows 8), the execution manager 411 may determine the external electronic device is able to provide the second OS as a device for providing the execution screen of the application. When the third OS (for example, Windows 7) is older than the first OS (for example, Windows 8) and is more recent than, or the same as, the second OS (for example, Linux), the execution manager 411 may determine the electronic device is able to provide the first OS as a device for providing the execution screen of the application.

According to various embodiments of the present disclosure, the execution manager 411 may control each device in order to provide an execution screen of each application through a determined device. For example, the execution manager 411 may provision of an execution screen of a first application (for example, a content play application), which is previously provided through the electronic device 101, through the electronic device 101, and to provide, through the external electronic device 104, an execution screen of a second application (for example, a video call application), of which a new request to provide an execution screen is acquired. For example, the execution manager 411 may control the display of the execution screen of the first application through the electronic device 101 and to display the execution screen of the second application through the external electronic device 104, and it is apparent to those skilled in the art that the reverse is possible.

According to one embodiment of the present disclosure, the execution manager 411 may provide the execution screen of the first application and the execution screen of the second application through the electronic device. In this case, the execution manager 411 may display the execution screen of the first application through the electronic device. Further, the execution manager 411 may transmit data relating to the execution screen of the second application to the external electronic device so that the execution screen of the second application is displayed through the external electronic device.

According to one embodiment of the present disclosure, the execution manager 411 may execute the first application through the electronic device and may provide the execution screen of the first application through the display included in the electronic device. Further, the execution manager 411 may transmit data relating to the second application to the external electronic device so that the execution screen of the second application is provided through the external electronic device and the execution screen of the second application is provided through the display included in the external electronic device.

According to various embodiments of the present disclosure, although not shown, at least part of the processor 410, the memory 430, and the communication module 420 may not be arranged within the electronic device. For example, at least part of the memory 430 (for example, the device information DB 431) may not be included in the electronic device but may be included in an external electronic device (for example, the server) functionally connected with the electronic device. Accordingly, the electronic device may acquire device information or execution information through the at least part of the memory included in the external electronic device.

Figure 5:
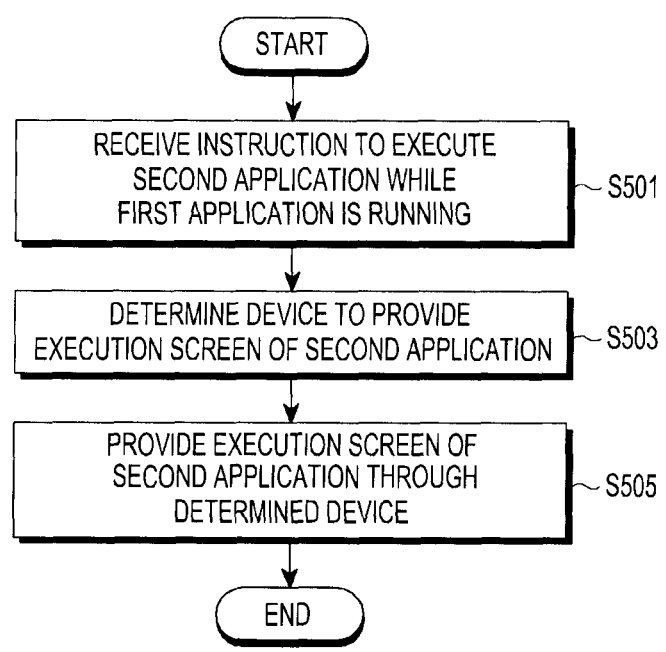
FIG. 5 is a flowchart illustrating a control method of the electronic device (for example, an execution manager 353, a processor 410, or an execution manager 411) according to various embodiments of the present disclosure.

FIG. 5 is a flowchart illustrating a control method of the electronic device (for example, the execution manager 353, the processor 410, or the execution manager 411) according to various embodiments of the present disclosure.

As illustrated in FIG. 5, in operation S501, the electronic device 101 (for example, the execution manager 353, the processor 410, or the execution manager 411) may receive an instruction to provide an execution screen of a second application while providing an execution screen of a first application. For example, the electronic device 101 may receive a video call while playing content through a content play application.

According to various embodiments of the present disclosure, the electronic device 101 (for example, the execution manager 353, the processor 410, or the execution manager 411) may control the display of the execution screen of the first application through not only the display 160 of the electronic device 101 but also the external electronic device 104.

According to various embodiments of the present disclosure, the electronic device 101 (for example, the execution manager 353, the processor 410, or the execution manager 411) may receive the instruction to provide the execution screen of the second application from an input/output interface (for example, the input/output interface 150) or a server (for example, the server 106) through either wireless/wire-based communication (for example, the wireless/wire-based communication 162)) and a communication module (for example, the communication module 170 or communication module 420). For example, the second application may be a call application, and the instruction to provide the execution screen of the second application may be a call received from the outside.

In operation S503, the electronic device 101 (for example, the execution manager 353, the processor 410, or the execution manager 411) may determine a device to provide the execution screen of the second application. For example, the electronic device 101 may determine a device to be used to provide the execution screen of the second application among the electronic device 101 and the external electronic device 104 functionally connected with the electronic device 101.

According to various embodiments of the present disclosure, the electronic device 101 may determine a device to provide the execution screen of the second application based on second application execution information. For example, when the second application execution information is first information, the electronic device 101 may determine the electronic device 101 as a device to provide the execution screen of the second application. Further, when the second application execution information is second information, the electronic device 101 may determine the external electronic device 104 as a device to provide the execution screen of the second application.

According to various embodiments of the present disclosure, the electronic device 101 may determine a device to provide the execution screen of the second application and a device to provide the execution screen of the first application based on the second application execution information and first application execution information. For example, when the first application execution information is first information and the second application execution information is second information, the electronic device 101 may determine the electronic device 101 as a device to provide the execution screen of the first application and may determine the external electronic device 104 as a device to provide the execution screen of the second application. Further, when the first application execution information is second information and the second application execution information is first information, the electronic device 101 may determine the electronic device 101 as a device to provide the execution screen of the second application and may determine the external electronic device 104 as a device to provide the execution screen of the first application.

According to various embodiments, the electronic device 101 may determine, based on information on each electronic device along with the first application execution information and the second application execution information, devices to provide the execution screens of the first application and the second application, respectively. For example, the first application execution information may be a first execution information, and the second application execution information may be a second execution information. Further, when the device information on the electronic device 101 may be the first device information corresponding to the first execution information, and the device information on the external electronic device 104 may be the second device information corresponding to the second execution information. In this case, the electronic device 101 may determine the electronic device 101 as a device to provide the execution screen of the first application and may determine the external electronic device 104 as a device to provide the execution screen of the second application.

In operation S505, the electronic device 101 may provide the execution screen of the second application through each determined device. For example, when the electronic device 101 is determined as a device that is to provide the execution screen of the second application, the electronic device 101 may provide the execution screen of the second application through the display included in the electronic device 101. Further, when the external electronic device 104 is determined as a device that is to provide the execution screen of the second application, the electronic device 101 may transmit data relating to the second application (or data relating to the execution screen of the second application) to the external electronic device 104. Accordingly, the execution screen of the second application may be provided through the external electronic device 104.

Figure 6A:
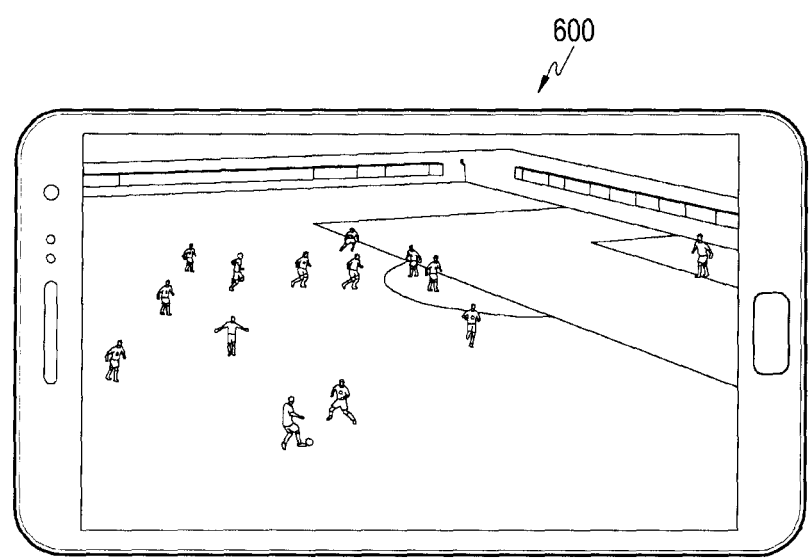
FIG. 6A illustrates an electronic device according to various embodiments of the present disclosure.

FIG. 6A illustrates an electronic device according to various embodiments of the present disclosure.

As illustrated in FIG. 6A, the electronic device 600 may be, for example, a smartphone 600. Furthermore, the electronic device 600 may operate a first application and may display an execution screen of the first application. For example, as illustrated in FIG. 6A, the first application may be a video play application, and the execution screen of the first application may be a video play screen. According to various embodiments, the electronic device 600 may control an external electronic device (for example, the external electronic device 104) so that the execution screen of the first application (video play screen) is displayed not only through the electronic device 600 but also through the external electronic device 104.

Figure 6B:
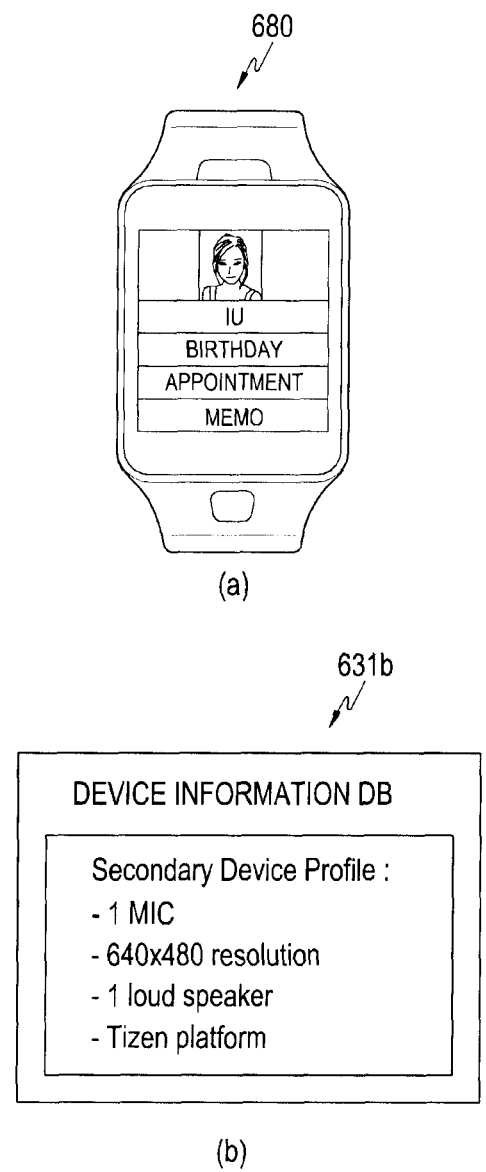
FIG. 6B illustrates an example of an external electronic device according to various embodiments of the present disclosure.

FIG. 6B illustrates an example of an external electronic device according to various embodiments of the present disclosure.

As illustrated in FIG. 6B(a), the external electronic device 680 may be, for example, a smartwatch 680 that is external to the electronic device (smartphone) 600. Still referring to FIG. 6B(b), the device information DB 431 of the memory 430 may store, for example, device information 631b on the external electronic device 680. More specifically, the external electronic device information 631b may include resolution information ("640×480 resolution"), output information ("1 MIC (microphone)", "1 loud speaker"), and OS information ("Tizen platform").

Figure 6C:
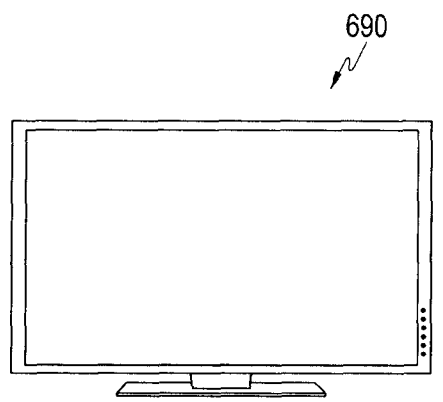
FIG. 6C illustrates another example of an external electronic device according to various embodiments of the present disclosure.
Figure 6C:
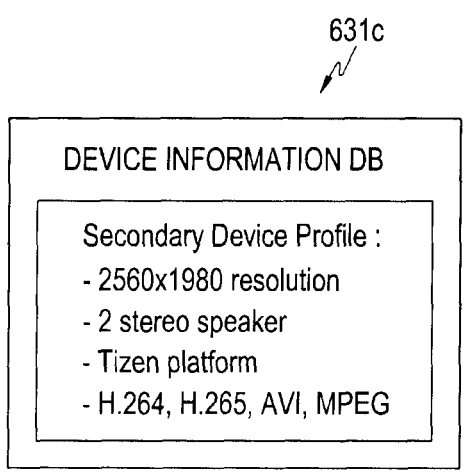

FIG. 6C illustrates another example of an external electronic device according to various embodiments of the present disclosure.

As illustrated in FIG. 6C(a), the external electronic device 690 may be, for example, a smart TV 690 that is, of course, external to the electronic device (smartphone) 600.

As illustrated in FIG. 6C(b), the device information DB 431 of the memory 430 may store, for example, device information 631c regarding the external electronic device 690. Specifically, the external electronic device information 631c may include resolution information ("2560×1980 resolution"), output information ("2 stereo speaker"), and OS information ("Tizen platform", "H.264, H.265, AVI, MPEG").

FIG. 7 illustrates an application execution screen according to various embodiments of the present disclosure.

Figure 7A:
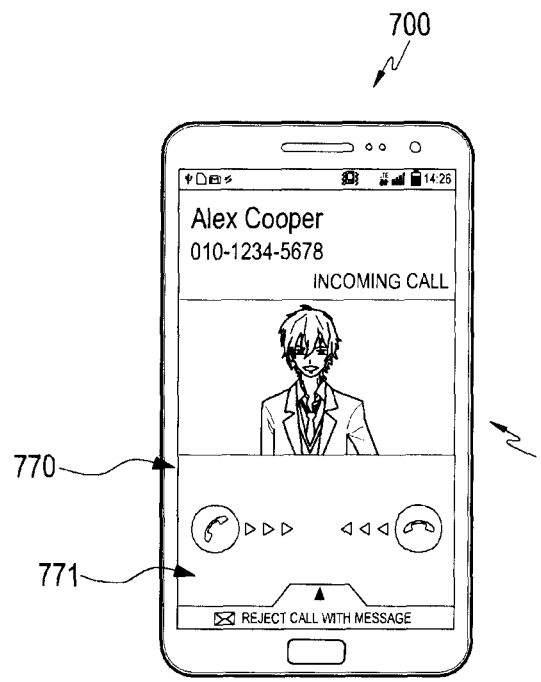
FIG. 7A and FIG. 7B illustrate an application execution screen according to various embodiments of the present disclosure.

Referring now to FIG. 7(A), an electronic device 700 may execute a second application and may display a second application execution screen 771 on a display 770.

For example, the second application may be a video call application (VT call), and the second application execution screen 771 may be a video call screen 771.

Figure 7B:
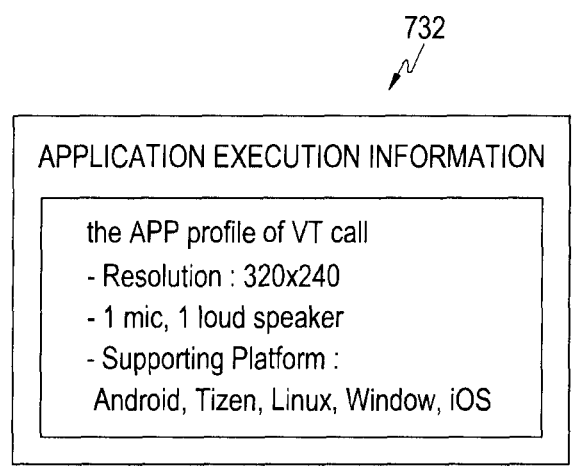

As illustrated in FIG. 7(B), the application execution information DB 432 of the memory 430 may store, for example, execution information 732 regarding the second application requested to run.

For example, the application execution information 732 on the second application (VT call) may include one or more conditions for running the second application. For example, the second application execution information 732 may include a resolution condition ("Resolution: 320×240"), an output condition ("1 mic, 1 loud speaker"), and an OS condition ("Supporting Platform: Android, Tizen, Linux, Window, iOS").

Figure 8:
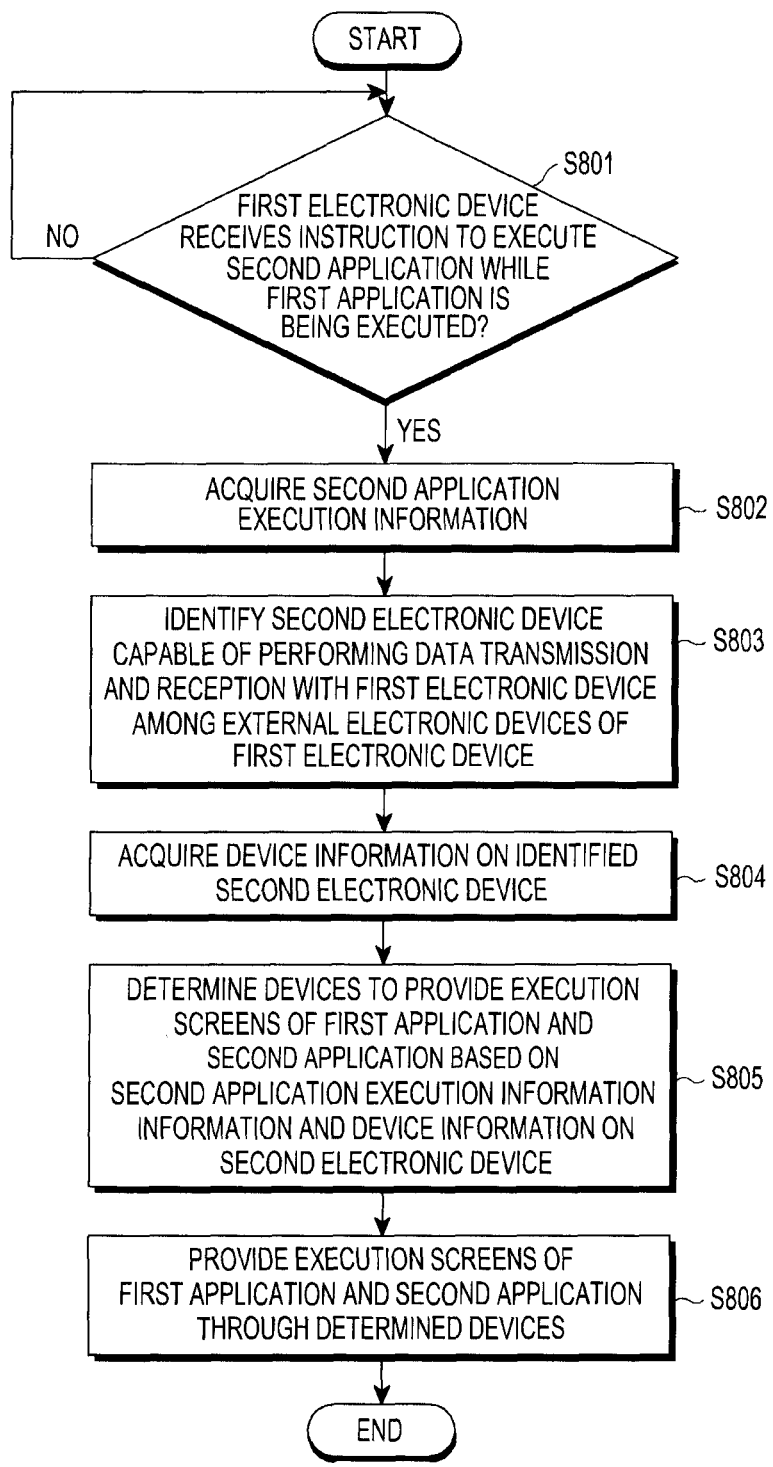
FIG. 8 is a flowchart illustrating a method of providing execution screens of a first application and a second application according to various embodiments of the present disclosure.

FIG. 8 is a flowchart illustrating operations for a method of providing execution screens of a first application and a second application according to various embodiments of the present disclosure.

As illustrated in FIG. 8, in operation S801, a first electronic device (for example, the electronic device 101, the execution manager 353, the processor 410, or the execution manager 411) may determine whether an instruction to provide an execution screen of the second application is transmitted to the first electronic device 101 while providing an execution screen of the first application. For example, when a call is received while an execution screen of a browser application is being provided, the first electronic device 101 may determine that an instruction to provide an execution screen of the call application is received. Further, when a user input relating to video play while an execution screen of a word processing application is being provided, the first electronic device 101 may determine that an instruction to provide an execution screen of a video play application is received.

In operation S802, when it is determined that the instruction to provide the execution screen of the second application is received, the first electronic device 101 (for example, the electronic device 101, the execution manager 353, the processor 410, or the execution manager 411) may acquire execution information on the second application. When it is determined that the instruction to provide the execution screen of the second application is not received, the first electronic device 101 may repeat operation S801.

In operation S803, the first electronic device (for example, the electronic device 101, the execution manager 353, the processor 410, or the execution manager 411) may identify a second electronic device (for example, the electronic device 104) that can perform data transmission and reception with the first electronic device among external electronic devices of the first electronic device. For example, the first electronic device may (for example, automatically) identify a device connected via wireless or wire-based communication as the second electronic device capable of performing data transmission and reception. Further, the first electronic device may identify the second electronic device that can perform data transmission and reception based on a user input.

In operation S804, the first electronic device 101 (for example, the electronic device 101, the execution manager 353, the processor 410, or the execution manager 411) may acquire device information on the identified second electronic device 104. For example, the first electronic device 101 may request the device information on the second electronic device 104 from the second electronic device 104. Accordingly, the first electronic device 101 may acquire the device information on the second electronic device 104 from the second electronic device 104. Also, the first electronic device 101 may acquire the device information on the second electronic device 104 through a memory of the first electronic device 101 (for example, the memory 430 or the device information DB 431 included in the first electronic device). In addition, the first electronic device 101 may acquire the device information on the second electronic device 104 through an external electronic device (for example, a server).

In operation S805, the first electronic device 101 (for example, the electronic device 101, the execution manager 353, the processor 410, or the execution manager 411) may determine devices to provide the respective execution screens of the first application and the second application based on second application execution information and the device information on the second electronic device 104.

In operation S806, the first electronic device 101 (for example, the electronic device 101, the execution manager 353, the processor 410, or the execution manager 411) may control to provide the respective execution screens of the first application and the second application through the determined devices.

Figure 9:
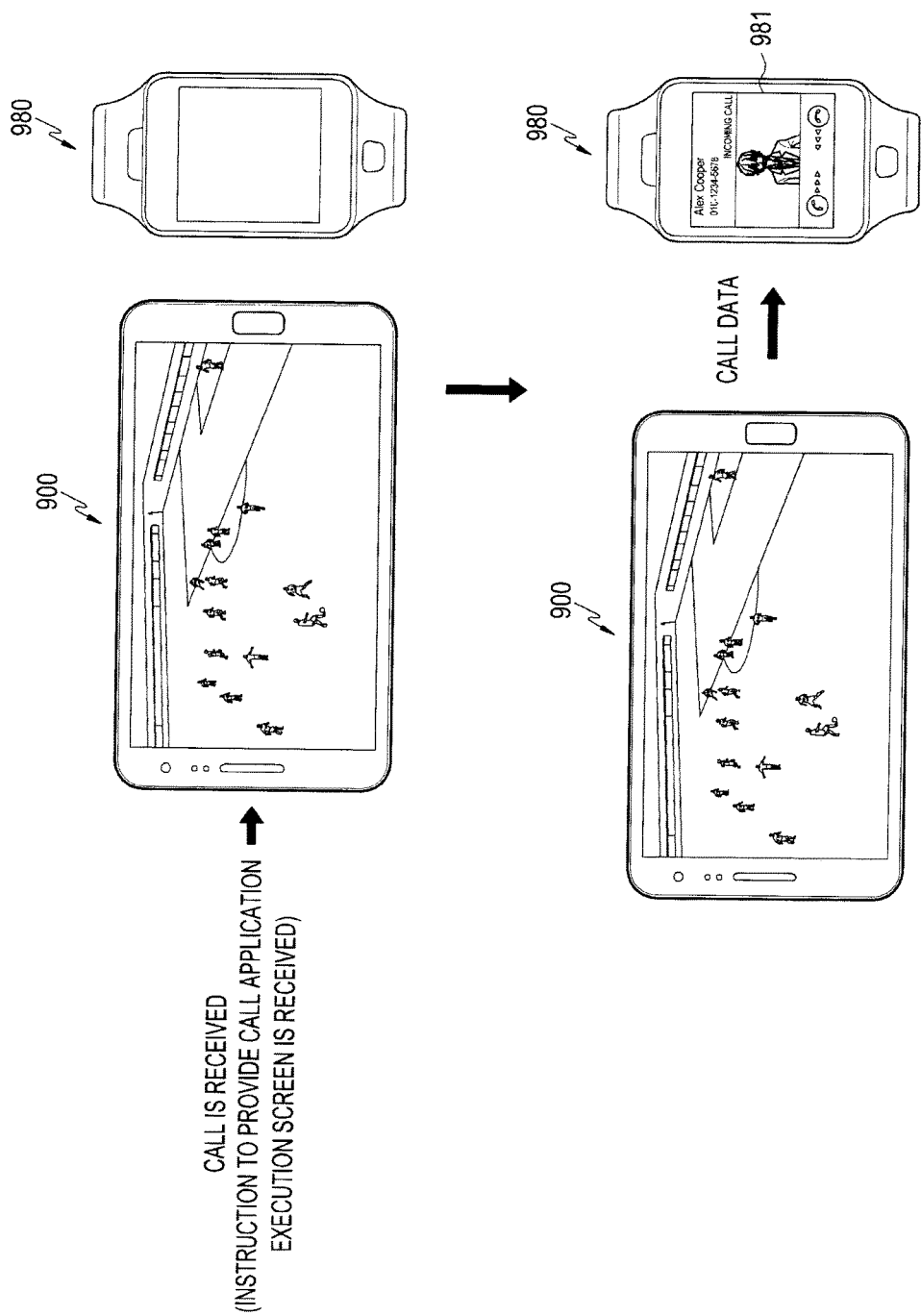
FIG. 9 illustrates one example of an operation of providing execution screens of a first application and a second application according to various embodiments of the present disclosure.

FIG. 9 illustrates one example of an operation of providing execution screens of a first application and a second application according to various embodiments of the present disclosure.

As illustrated in FIG. 9, according to various embodiments of the present disclosure, when an instruction to execute the second application is received (a call is received) while an execution screen of the first application (video play application) is being provided through a first electronic device 900 (smartphone), the first electronic device 900 may acquire second application execution information. For example, when an instruction to provide an execution screen of the second application is received, the first electronic device 900 may identify a second electronic device 980 (smartwatch) that can perform data transmission and reception with the first electronic device 900 among one or more external electronic devices. For example, when the second electronic device 980 is identified, the first electronic device 900 may acquire device information on the identified second electronic device 980. For example, when the device information on the second electronic device and the second application execution information are acquired, the first electronic device 900 may determine devices to provide the respective execution screens of the first application and the second application from among the first electronic device 900 and the second electronic device 980 based on the device information on the second electronic device and the second application execution information. For example, the first electronic device 900 may determine, based on the device information on the second electronic device and the second application execution information, the second electronic device 980 as a device designated to provide the execution screen of the second application and the first electronic device 900 as a device designated to provide the execution screen of the first application.

According to various embodiments, when the second electronic device 980 is determined as a device to provide the execution screen of the second application and the first electronic device 900 is determined as a device to provide the execution screen of the first application, the first electronic device 900 may provide the execution screen of the first application through the first electronic device 900 (or a display included in the first electronic device 900), and may control the second electronic device to provide the execution screen of the second application through the second electronic device 980. For example, the first electronic device 900 may continue executing the first application, which has already run through the first electronic device 900, through the first electronic device 900 and may continue displaying the execution screen of the first application through the first electronic device 900. For example, the first electronic device 900 may execute the second application, which is requested to be executed, through the second electronic device 980, and may control the second electronic device 980 so that the execution screen 981 of the second application is displayed through the second electronic device 980. For example, the first electronic device 900 may transmit data necessary to run the second application to the second electronic device 980 through a communication module (for example, the communication module 420). For example, the first electronic device 900 may transmit the data necessary to run the second application to the second electronic device 980 in response to a request for data on the second application, which is received through the second electronic device 980.

Figure 10:
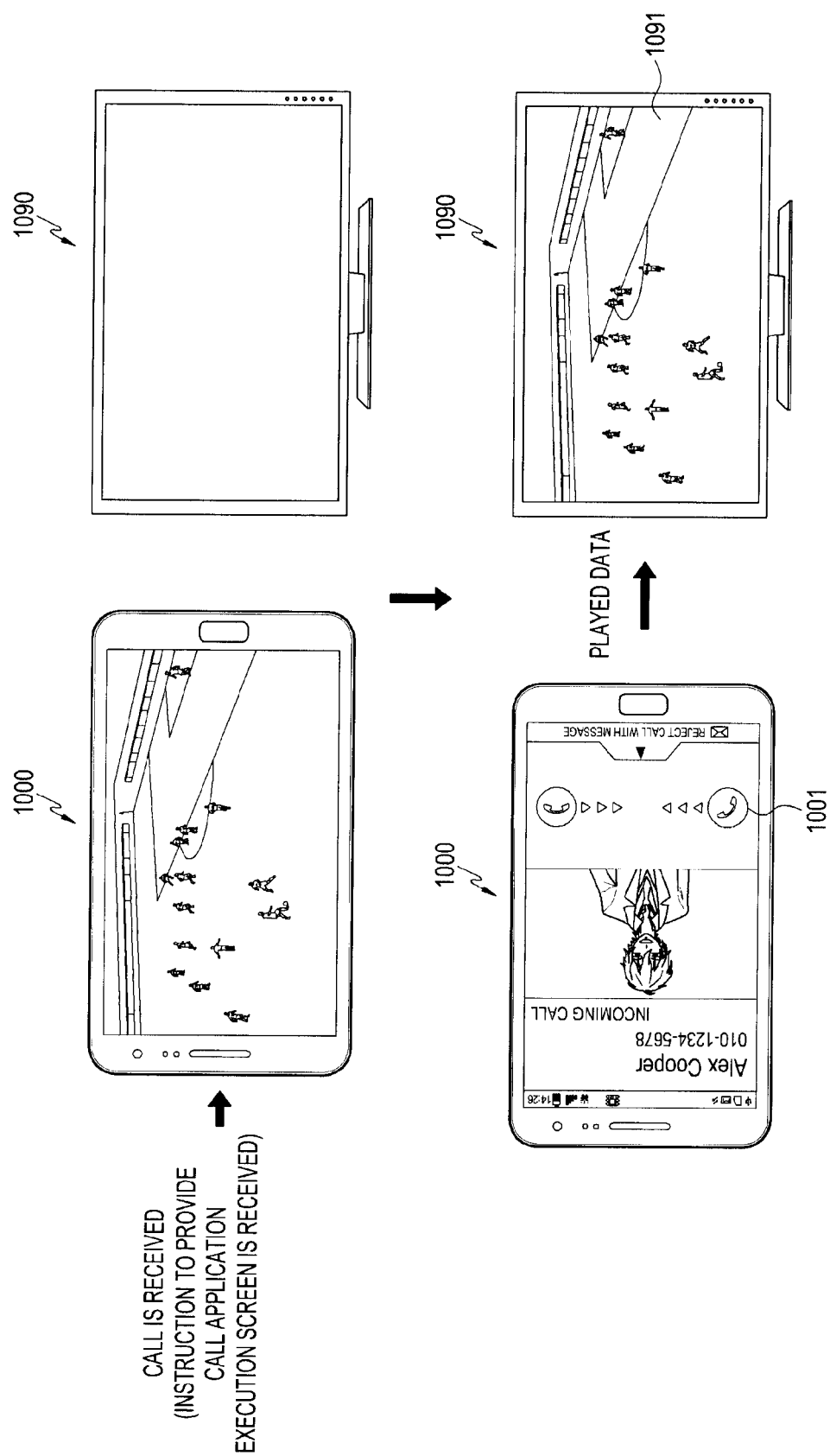
FIG. 10 illustrates another example of an operation of providing execution screens of a first application and a second application according to various embodiments of the present disclosure.

FIG. 10 illustrates another example of an operation of providing execution screens of a first application and a second application according to various embodiments of the present disclosure.

As illustrated in FIG. 10, according to various embodiments of the present disclosure, when an instruction to provide an execution screen of a call application is received while an execution screen of a video play application is being provided through a first electronic device 1000, the first electronic device 1000 may acquire call application execution information. For example, when the instruction to provide the execution screen of the call application is received, the first electronic device 1000 may identify a second electronic device 1090 (TV) that can perform data transmission and reception with the first electronic device 1000 from among one more external electronic devices. For example, when the second electronic device 1090 is identified, the first electronic device 1000 may acquire device information on the identified second electronic device 1090. For example, when the device information on the second electronic device and second application execution information are acquired, the first electronic device 1000 may determine devices to provide the respective execution screens of the video play application and the call application from among the first electronic device 1000 and the second electronic device 1090 based on the device information on the second electronic device and the second application execution information. For example, the first electronic device 1000 may determine, based on the device information on the second electronic device and the call application execution information, the first electronic device 1000 as a device designated to provide the execution screen of the call application and the second electronic device 1090 designated as a device to provide the execution screen of the video play application.

According to various embodiments of the present disclosure, when the first electronic device 1000 is determined to be a device designated to provide the execution screen of the call application and the second electronic device 1090 is determined to be a device designated to provide the execution screen of the video play application, the first electronic device 1000 may provide the execution screen of the call application through the first electronic device 1000 and may control the second electronic device 1090 to be a device designated to provide the execution screen of the video play application through the second electronic device 1090.

For example, the first electronic device 1000 may execute the video play application, which has already been executed through the first electronic device 1000, through the second electronic device 1090, not through the first electronic device 1000 that has run the video play application, and may display a video play screen 1091 through the second electronic device 1090.

For example, the first electronic device 1000 may transmit data necessary to execute the video play application by the second electronic device 1090 through a communication module (for example, the communication module 420). For example, the first electronic device 1000 may transmit the data necessary to execute the video play application to the second electronic device 1090 in response to a request for data on the video play application, which is received through the second electronic device 1090.

For example, the first electronic device 1000 may execute the call application, of which the execution screen is requested, and may display a call screen 1001.

Figure 11:
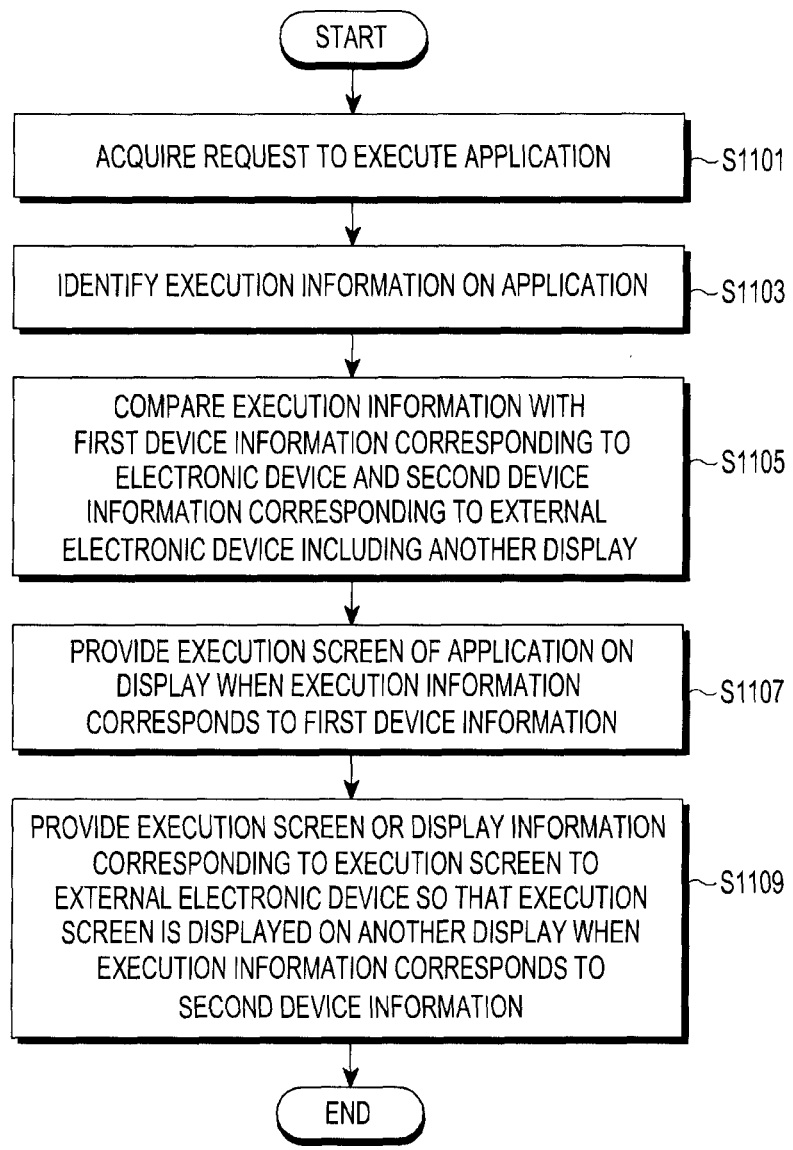
FIG. 11 is a flowchart illustrating a control method of an electronic device according to various embodiments of the present disclosure.

FIG. 11 is a flowchart illustrating a control method of an electronic device according to various embodiments of the present disclosure.

As illustrated in FIG. 11, in operation S1101, the electronic device (for example, the electronic device 101) may acquire a request to execute an application.

In operation S1103, the electronic device 101 may identify execution information on the application.

In operation S1105, the electronic device 101 may compare the execution information with first device information corresponding to the electronic device and second device information corresponding to an external electronic device including another display.

In operation S1107, when the execution information corresponds to the first device information, the electronic device 101 may provide an execution screen of the application on a display (for example, the display 160).

In operation S1109, when the execution information corresponds to the second device information, the electronic device 101 may provide the execution screen or display information corresponding to the execution screen to the external electronic device so that the execution screen is displayed on the other display.

Figure 12:
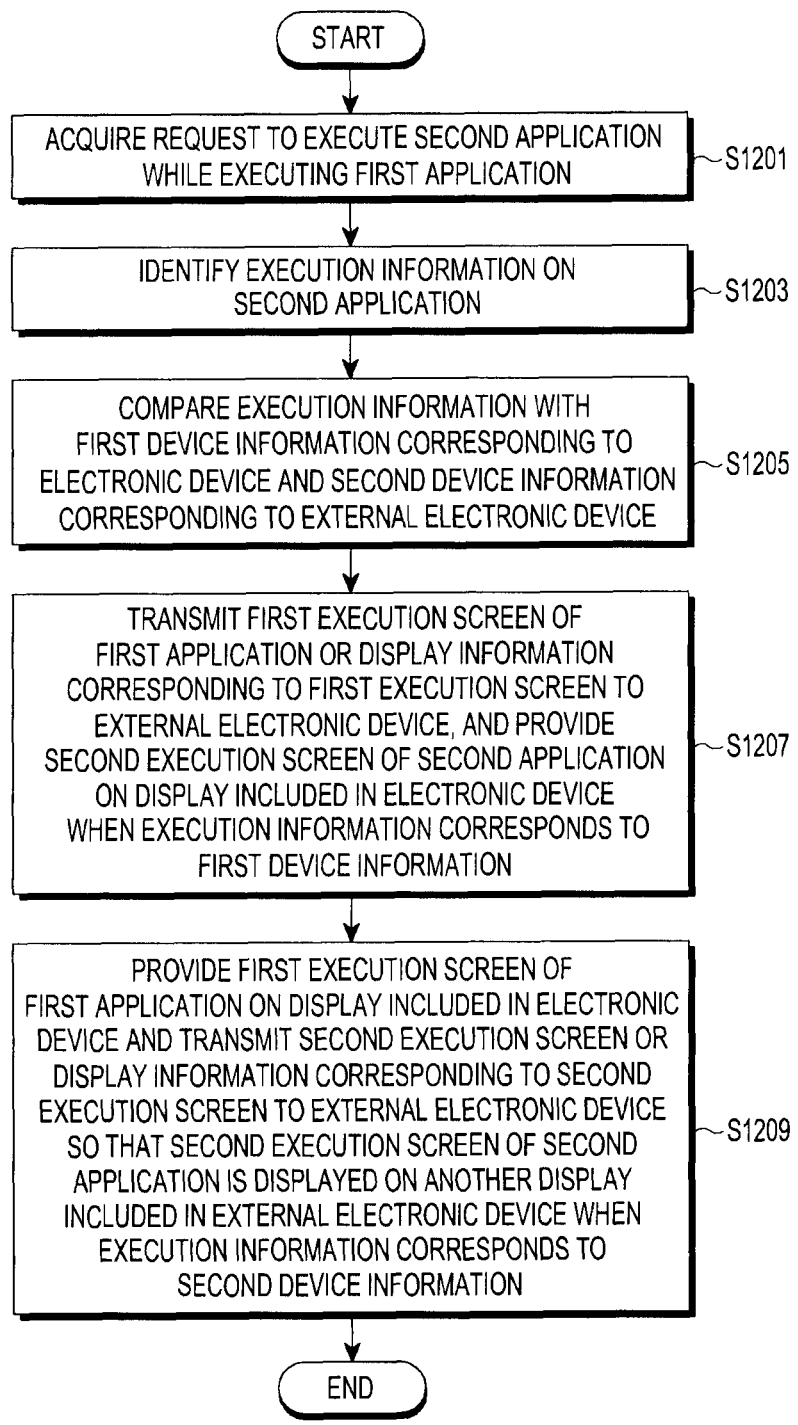
FIG. 12 is a flowchart illustrating a control method of an electronic device according to various embodiments of the present disclosure.

FIG. 12 is a flowchart illustrating a control method of an electronic device according to various embodiments of the present disclosure.

As illustrated in FIG. 12, in operation S1201, the electronic device 101 may acquire a request to execute a second application while executing a first application.

In operation S1203, the electronic device 101 may identify execution information on the second application.

In operation S1205, the electronic device 101 may compare the execution information on the second application with first device information corresponding to the electronic device and second device information corresponding to an external electronic device.

In operation S1207, when the execution information on the second application corresponds to the first device information, the electronic device 101 may transmit a first execution screen of the first application or display information corresponding to the first execution screen to the external electronic device and may provide a second execution screen of the second application on a display (for example, the display 160) included in the electronic device.

In operation S1209, when the execution information on the second application corresponds to the second device information, the electronic device 101 may provide the first execution screen of the first application on the display 160 included in the electronic device and may transmit the second execution screen or display information corresponding to the second execution screen to the external electronic device so that the second execution screen of the second application is displayed on another display included in the external electronic device.

A method of providing an application using an external electronic device according to various embodiments of the present disclosure may include: acquiring, by an electronic device including a display, a request to execute an application, the acquiring including identifying execution information on the application; comparing the execution information with first device information corresponding to the electronic device and second device information corresponding to the external electronic device including another display; providing an execution screen of the application through the display when the execution information corresponds to the first device information; and transmitting the execution screen or display information corresponding to the execution screen to the external electronic device so that the execution screen is provided through the other display when the execution information corresponds to the second device information.

According to various embodiments of the present disclosure, the request may be received while another application is being executed by the electronic device.

According to various embodiments, the method may further include: identifying another execution information on the other application; and comparing the other execution information with the first device information and the second device information.

According to various embodiments of the present disclosure, the providing may include transmitting, to the external electronic device, another execution screen of the other application, or another display information corresponding to the other execution screen so that the other execution screen is provided through the other display.

According to various embodiments of the present disclosure, the transmitting of the other display information to the external electronic device may be performed further based on another execution information on the other application corresponding to the second device information.

According to various embodiments of the present disclosure, the transmitting may include providing another execution screen of the other application through the display.

According to various embodiments, the providing of the other execution screen of the other application through the display may be performed further based on another execution information on the other application corresponding to the first device information.

According to various embodiments, the transmitting may include operating the application through the electronic device.

According to various embodiments, the method may further include acquiring the second device information based on the electronic device being functionally connected with the external electronic device.

According to various embodiments, the method may further include acquiring the second device information based on at least part of the acquiring.

According to various embodiments, the execution information may include any one or more conditions among resolution information and output information on the execution screen, and operating system information for running the application.

According to various embodiments, the first device information or the second device information may include any one or more of resolution information and output information on the display or the other display, and operating system information on the electronic device or the external electronic device.

An electronic device for providing an application using an external electronic device according to various embodiments of the present disclosure may include: a memory that stores first device information on the electronic device; a display; a communication module that communicates with the external electronic device; and a processor, wherein the processor may be configured to: acquire a request to run an application, in which the processor identifies execution information on the application; compare the execution information with first device information and second device information corresponding to the external electronic device including another display; provide an execution screen of the application through the display when the execution information corresponds to the first device information; and transmit the execution screen or display information corresponding to the execution screen to the external electronic device through the communication module so that the execution screen is provided through the other display when the execution information corresponds to the second device information.

According to various embodiments, the processor may be configured to identify the execution information at least partly based on the request being acquired while another application is being executed on the electronic device.

According to various embodiments, the processor may be configured to transmit another execution screen of the other application or another display information corresponding to the other execution screen to the external electronic device through the communication module when the execution screen is provided through the display.

According to various embodiments, the processor may be configured to provide another execution screen of the other application through the display when the execution screen or the display information is transmitted to the external electronic device.

According to various embodiments, the processor may be configured to acquire the second device information from the external electronic device through the communication module.

According to various embodiments, the processor may be configured to acquire the second device information through the memory.

A computer-readable storage device recording a program that provides an application using an external electronic device according to various embodiments of the present disclosure may record the program to perform: acquiring, by an electronic device including a display, a request to run an application, the acquiring including identifying execution information on the application; comparing the execution information with first device information corresponding to the electronic device and second device information corresponding to the external electronic device including another display; providing an execution screen of the application through the display when the execution information corresponds to the first device information; and transmitting the execution screen or display information corresponding to the execution screen to the external electronic device so that the execution screen is provided through the other display when the execution information corresponds to the second device information.

According to various embodiments, the request may be received while another application is executing on the electronic device.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

The term "module" used in the present disclosure may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may, for example, be the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

According to various embodiments, a storage medium stores commands, wherein the commands are set for at least one processor to perform at least one operation when executed by the at least one processor, and the at least one operation may include: acquiring, by an electronic device including a display, a request to run an application, the acquiring including identifying execution information on the application; comparing the execution information with first device information corresponding to the electronic device and second device information corresponding to the external electronic device including another display; providing an execution screen of the application through the display when the execution information corresponds to the first device information; and transmitting the execution screen or display information corresponding to the execution screen to the external electronic device so that the execution screen is provided through the other display when the execution information corresponds to the second device information.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as by at least one processor, so that the methods described herein are loaded into hardware such as a general purpose computer, or a special processor or in programmable or dedicated hardware, such as an ASIC or FPGA.

As would be understood in the art, the computer, the processor, microprocessor, controller, control unit or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

In addition, an artisan understands and appreciates that a "processor", "microprocessor" "controller", or "control unit" constitute hardware in the claimed disclosure that contain circuitry, such as integrated circuitry, that is configured for operation. The control unit/controller may include a microprocessor or any suitable type of processing circuitry, such as one or more general-purpose processors (e.g., ARM-based processors), Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

Under the broadest reasonable interpretation, the appended claims constitute statutory subject matter in compliance with 35 U.S.C. § 101 and none of the elements are software per se.

Nor are the claims directed to Abstract ideas, and constitute statutory subject matter under 35 U.S.C. § 101.

The definition of the terms "unit" or "module" as referred to herein are to be understood as constituting hardware circuitry such as a CCD, CMOS, SoC, AISC, FPGA, at least one processor or microprocessor (e.g. a controller or control unit) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and do not constitute software per se.

Various embodiments disclosed herein are provided merely to describe technical details of the present disclosure and to help the artisan with an understanding of the present disclosure, and these embodiments do not limit the scope of the present disclosure. Therefore, it should be construed that all modifications and changes or modified and changed forms based on the technical idea of the present disclosure fall within the scope of the present disclosure.

What is claimed is:

1. A method of providing an application that is operable in an electronic device having a first display, and in an external electronic device having a second display, the method comprising:
    in response to receiving, by the electronic device, a request to execute an application, identifying execution information on the application;
    selecting one of the electronic device and the external electronic device to display an execution screen of the application based at least in part on a currently running application on the electronic device and the execution information;
    providing, by the electronic device, the execution screen of the application to be displayed by the first display when the electronic device is selected for displaying the execution screen of the application; and
    transmitting, by the electronic device to the external electronic device, a command and data to display the execution screen of the application, or to display meta information corresponding to the execution screen, such that the execution screen is provided by the second display when the external electronic device is selected for displaying the execution screen of the application.

2. The method of claim 1, wherein the request to execute the application is received while the currently running application is being executed by the electronic device.

3. The method of claim 2, further comprising:
    identifying an another execution information regarding the currently running application; and
    identifying whether the another execution information regarding the currently running application corresponds to a first device information corresponding to the electronic device or corresponds to a second device information corresponding to the external electronic device.

4. The method of claim 2, wherein the providing the execution screen comprises transmitting, to the external electronic device, another execution screen of the currently running application or another meta information corresponding to the another execution screen of the currently running application, such that the another execution screen of the currently running application is provided by the second display.

5. The method of claim 4, wherein the transmitting of the another meta information to the external electronic device is performed when the external electronic device is selected for displaying the another execution screen of the currently running application.

6. The method of claim 4, wherein the transmitting of another meta information to the external electronic device comprises providing the another execution screen of the currently running application through the second display.

7. The method of claim 6, further comprising providing the another execution screen through the first display when the electronic device is selected for displaying the another execution screen of the currently running application.

8. The method of claim 1, wherein the transmitting of the execution screen comprises executing the application by the electronic device.

9. The method of claim 1, further comprising:
    acquiring a second device information corresponding to the external electronic device when the electronic device is functionally connected with the external electronic device.

10. The method of claim 1, further comprising:
acquiring a second device information corresponding to the external electronic device based on at least part of the acquiring of the request to execute the application.

11. The method of claim 1, wherein the execution information comprises one or more conditions from among resolution information and output information on the execution screen, and operating system information for running the application.

12. The method of claim 3, wherein the first device information or the second device information comprises one or more of resolution information and output information on the first display or the second display, and operating system information on the electronic device or the external electronic device.

13. An electronic device that provides an application using an external electronic device, the electronic device comprising:
a non-transitory memory that stores a first device information on the electronic device;
a first display;
a communication module that communicates with the external electronic device comprising a second display; and
at least one processor,
wherein the at least one processor is configured to:
in response to receiving a request to execute an application, identify execution information on the application;
select one of the electronic device and the external electronic device to display an execution screen of the application based at least in part on a currently running application on the electronic device and the execution information;
provide the execution screen of the application through the first display when the electronic device is selected for displaying the execution screen of the application; and
transmit a command and data to display the execution screen of the application, or meta information corresponding to the execution screen to the external electronic device through the communication module, such that the execution screen is provided by the second display when the external electronic device is selected for displaying the execution screen of the application.

14. The electronic device of claim 13, wherein the at least one processor is configured to identify the execution information at least partly based on the request for the execution screen being acquired while the currently running application is being executed on the electronic device.

15. The electronic device of claim 14, wherein the at least one processor is configured to transmit an another execution screen of the currently running application or another meta information corresponding to the another execution screen to the external electronic device through the communication module when the execution screen is provided through the first display.

16. The electronic device of claim 14, wherein the at least one processor is configured to provide an another execution screen of the currently running application through the first display when the execution screen or the meta information is transmitted to the external electronic device.

17. The electronic device of claim 13, wherein the at least one processor is configured to acquire a second device information corresponding to the external electronic device from the external electronic device through the communication module.

18. The electronic device of claim 13, wherein the at least one processor is configured to acquire a second device information corresponding to the external electronic device through the non-transitory memory.

19. A computer-readable non-transitory storage device recording a program that upon execution by at least one processor of an electronic device provides an application using an external electronic device, wherein the computer-readable storage device records the program to perform:
in response to receiving, by an electronic device comprising a first display, a request to execute an application, identifying execution information on the application;
selecting one of the electronic device and the external electronic device to display an execution screen of the application based at least in part on a currently running application on the electronic device and the execution information;
providing the execution screen of the application through the first display when the electronic device is selected for displaying the execution screen of the application; and
transmitting, by the electronic device, a command and data to display the execution screen of the application, or meta information corresponding to the execution screen to the external electronic device, such that the execution screen is provided by a second display of the external electronic device when the external electronic device is selected for displaying the execution screen of the application.

20. The computer-readable storage device of claim 19, wherein the request is received while the currently running application is being executed by the electronic device.

21. An electronic device comprising:
a memory that stores program corresponding a plurality of applications;
a display;
a communication module that communicates with an external electronic device; and
at least one processor,
wherein the at least one processor is configured to:
receive an event regarding to an application,
determine whether an execution screen of the application associated with the event is to be displayed by one of the electronic device and the external electronic device coupled with the electronic device based at least in part on a currently running application on the electronic device and the application,
control the display to display the execution screen of the application associated with the event when it is determined that the execution screen is to be displayed by the electronic device, and
transmit, through the communication module to the external electronic device, data for displaying the execution screen when it is determined that the execution screen is to be displayed by the external electronic device.

22. The electronic device of claim 21, wherein the at least one processor is configured to determine whether the execution screen is to be displayed by one of the electronic device and the external electronic device based at least in part on the application and an operating status of the electronic device when the event is received.

23. The electronic device of claim 22, wherein the operating status comprising the currently running application which is being executed by the electronic device when the event is received.

* * * * *